(12) United States Patent
Kodaira

(10) Patent No.: US 6,313,927 B1
(45) Date of Patent: Nov. 6, 2001

(54) IMAGE READING APPARATUS HAVING REFLECTING MIRROR THAT CHANGES OVER AN OPTICAL PATH TO READ AN ORIGINAL AT DIFFERENT POSITION

(75) Inventor: Takanori Kodaira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/967,131

(22) Filed: Nov. 12, 1997

(30) Foreign Application Priority Data

Dec. 16, 1996 (JP) .................................................. 8-335776

(51) Int. Cl.⁷ .................................................. H04N 1/04
(52) U.S. Cl. .................................................. 358/487; 358/496
(58) Field of Search .................................................. 358/474, 496, 358/487, 505, 506; 359/872, 876

(56) References Cited

U.S. PATENT DOCUMENTS

| | | | |
|---|---|---|---|
| 5,335,093 | * 8/1994 | Imoto | 358/487 |
| 5,638,189 | * 6/1997 | Yanagisawa | 358/481 |
| 5,754,314 | * 5/1998 | Araki et al. | 358/487 |
| 5,767,990 | * 6/1998 | Ikeda | 358/487 |
| 5,907,411 | * 5/1999 | Han | 358/487 |

\* cited by examiner

*Primary Examiner*—Cheukfan Lee
(74) *Attorney, Agent, or Firm*—Robin, Blecker & Daley

(57) ABSTRACT

In a film scanner capable of reading images from films of different forms, i.e., a cartridge film and a film strip, and arranged to be simply adjustable, image light from the cartridge film is reflected by a reflecting mirror to be projected on an image sensor which converts the projected image light into an image signal. Image light from the film strip is projected onto the image sensor to be converted also into an image signal with the reflecting mirror rotated counterclockwise away from its position by rotating a motor which moves a cam, etc. In manufacturing the film scanner, the position and inclination of the image sensor relative to the film strip are adjusted with the reflecting mirror retracted from its predetermined position, and a base plate on which the image sensor is mounted is fixed by an adhesive to a lens frame with the image sensor set in the adjusted position. For the cartridge film, the inclination of the reflecting mirror relative to the cartridge film is adjusted in its position by rotating an eccentric pin, etc., and the reflecting mirror is fixed at the adjusted inclination by an adhesive.

9 Claims, 3 Drawing Sheets

IMAGE READING APPARATUS HAVING REFLECTING MIRROR THAT CHANGES OVER AN OPTICAL PATH TO READ AN ORIGINAL AT DIFFERENT POSITION

BACKGROUND OF THE INVENTION

1. Field of the Invention

The present invention relates to an image reading apparatus such as a film scanner which is arranged to project an image recorded on a developed (processed) film onto an image sensor to obtain an image signal.

2. Description of Related Art

A conventional film scanner adapted for both of developed films of two different forms, i.e., a developed film which is separated from a cartridge and has a long, strip-like shape (hereinafter referred to as a film strip) and a developed film which is left stowed in a cartridge and is movable into and out of the cartridge (hereinafter referred to as a cartridge film), has such a structure that an image recorded on the film strip is held approximately in the same position where an image recorded on the cartridge film is to be held, and either of the images of the films of the both forms can be read by a common image sensor, as disclosed in Japanese Laid-Open Patent Application No. HEI 5-145838.

In the above-mentioned conventional film scanner, however, it is impossible to adjust the inclination and position of the surface of the image sensor with respect to an image surface of the film. Therefore, in a case where the relative positions of the image surface and the surface of the image sensor are in an inadequate relation, an image read out from the film is apt to become blurred.

BRIEF SUMMARY OF THE INVENTION

It is an object of the invention to provide an image reading apparatus which is capable of handling image originals of a plurality of forms.

It is another object of the invention to provide an image reading apparatus which is capable of reading images in a state of having a high picture quality.

To attain the above objects, In accordance with an aspect of the invention, there is provided an image reading apparatus which comprises first original holding means for holding an original of a first form, second original holding means disposed in a position different from the position of the first original holding means for holding an original of a second form, an image sensor for picking up an image recorded on one of the original of the first form and the original of the second form, a common image forming lens for imaging on the image sensor the image recorded on one of the original of the first form and the original of the second form, and reflection means for changing over an optical path so as to cause the image recorded on one of the original of the first form and the original of the second form to be imaged on the image sensor by the common image forming lens.

With the above construction, it is possible to provide an image reading apparatus which is adapted for each of originals of a plurality of forms and is capable of reading an image with a high picture quality.

These and other objects and features of the invention will become apparent from the following detailed description of an embodiment thereof taken in connection with the accompanying drawings.

DETAILED DESCRIPTION OF THE INVENTION

Hereinafter, a film scanner as a preferred embodiment of the invention will be described in detail with reference to the drawings.

Figure 1:
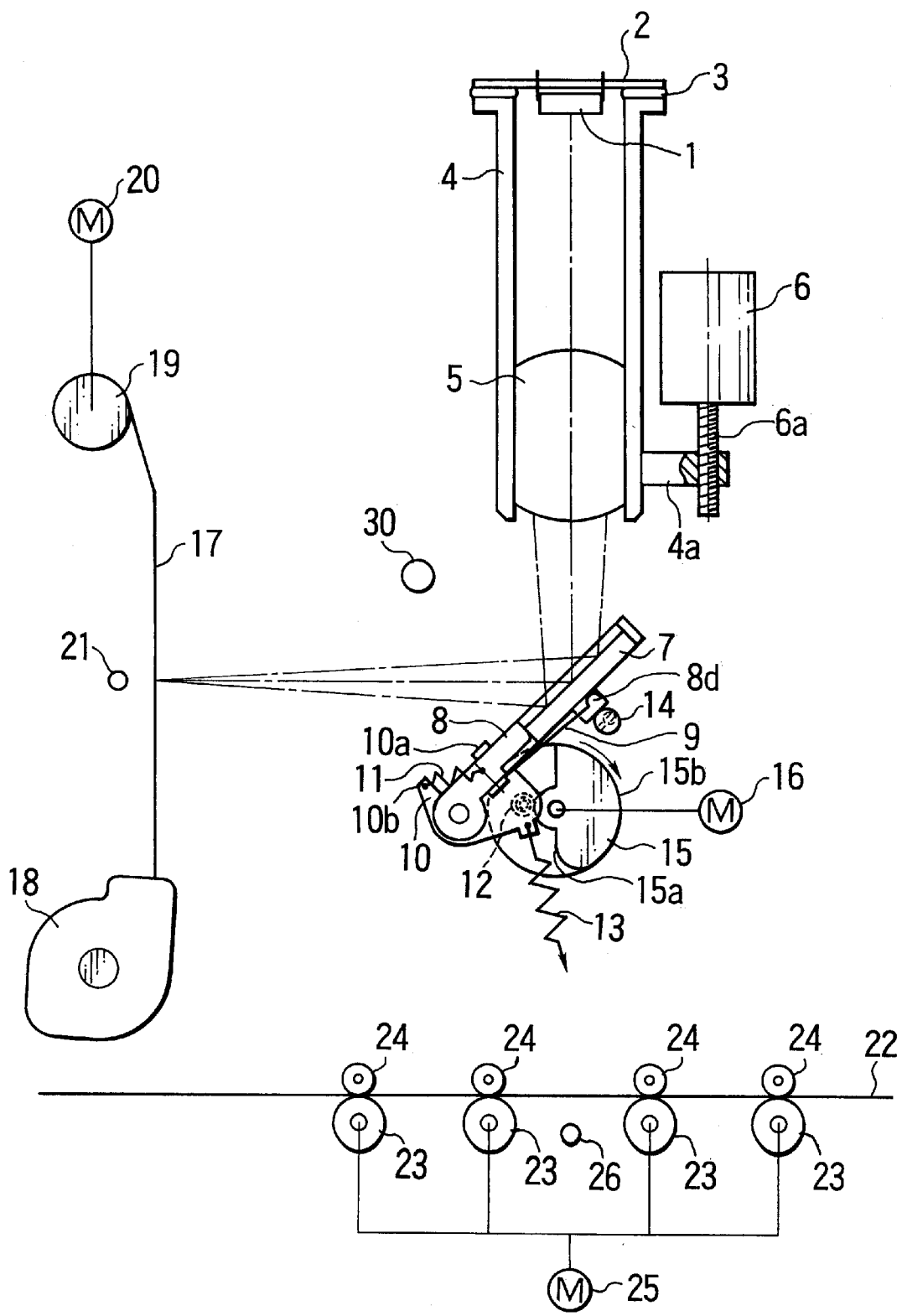
FIG. 1 is a schematic plan view showing the arrangement of a film scanner, according to an embodiment of the invention, in which an image recorded on a cartridge film is being read.
Figure 2:
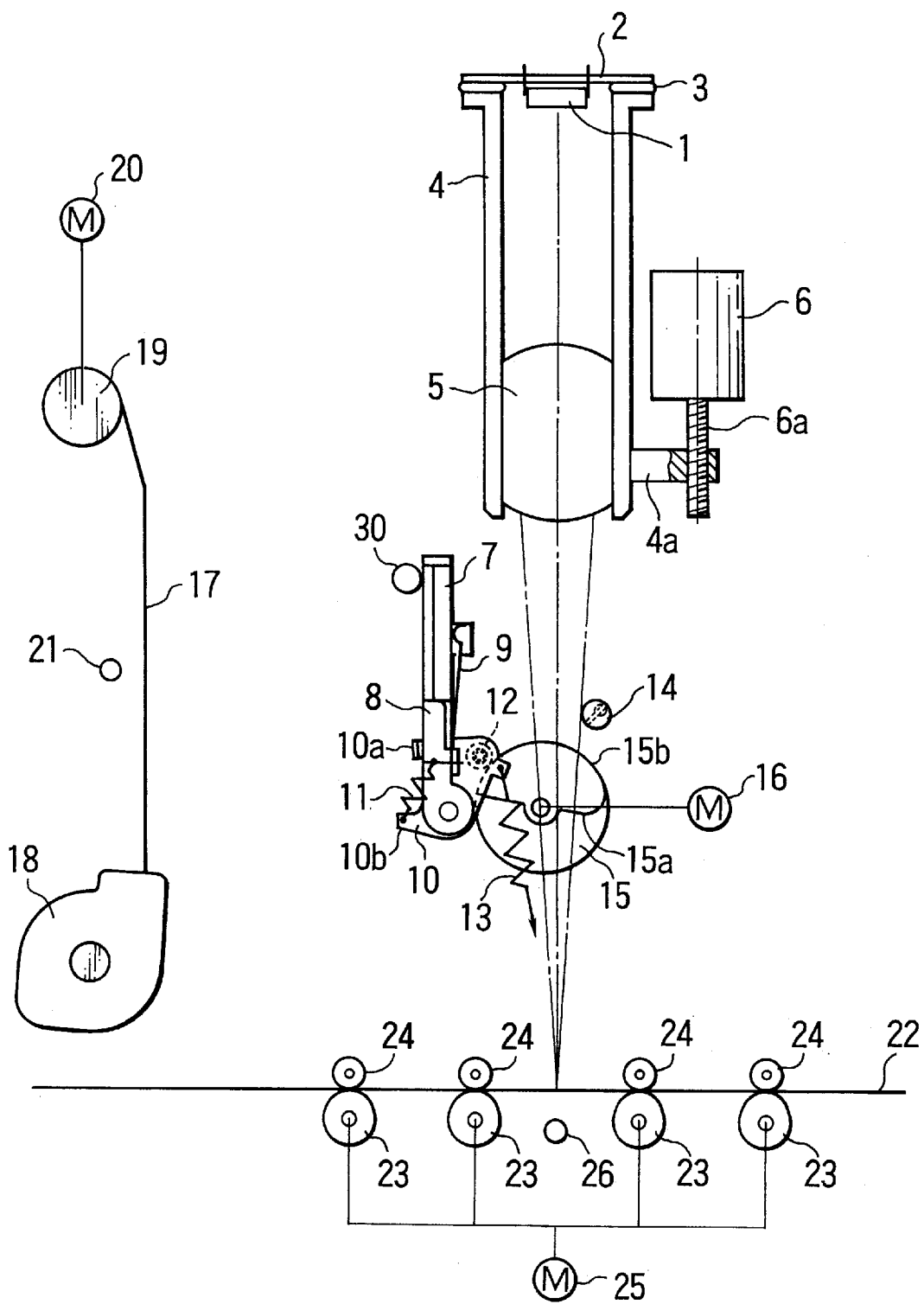
FIG. 2 is a schematic plan view showing the arrangement of the film scanner, in which an image recorded on a film strip is being read.
Figure 3:
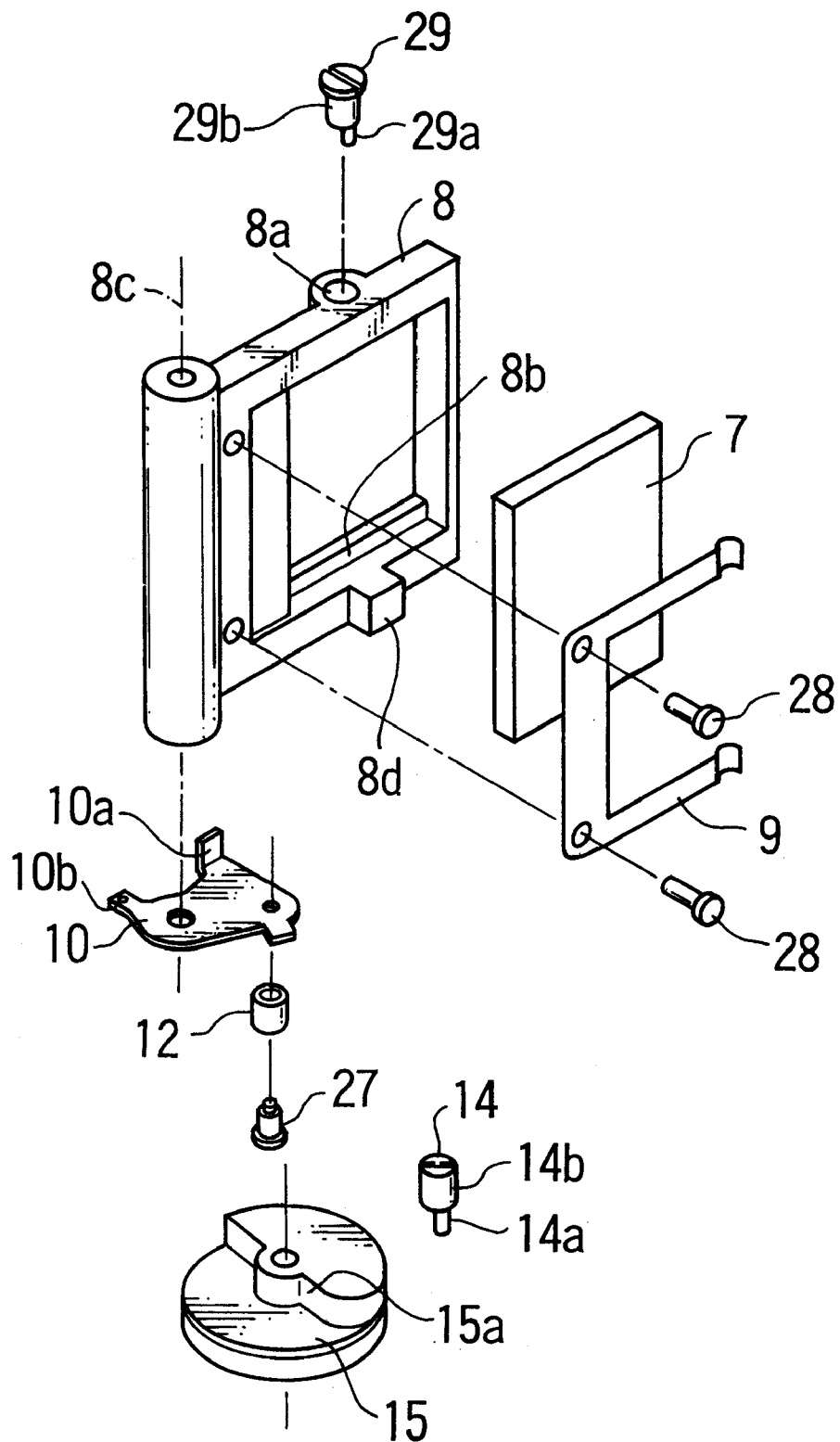
FIG. 3 is an exploded perspective view showing the vicinity of a reflecting mirror included in the film scanner.

FIGS. 1 and 2 are schematic plan views showing the arrangement of a film scanner according to the embodiment of the invention, FIG. 1 showing the state in which an image recorded on a cartridge film is being read and FIG. 2 showing the state in which an image recorded on a film strip is being read. FIG. 3 is an exploded perspective view showing the essential parts in the vicinity of a reflecting mirror in the film scanner.

Referring to FIGS. 1, 2 and 3, an image sensor 1 is composed of a CCD line sensor or the like and is fixedly secured to a base plate 2. The base plate 2 is fixedly secured by an adhesive 3 to a lens frame 4. Further, an image pickup lens 5 is fixedly secured to the lens frame 4. A screw 6a of a motor 6 engages an arm part 4a of the lens frame 4. The lens frame 4 is thus arranged to be movable by the motor 6 in the direction of an optical axis of the image pickup lens 5. A reflecting mirror 7 is disposed to abut on a support part 8b of a support frame 8 and a dowel 29a of a first eccentric pin 29 which is fitted in a hole part 8a of the support frame 8. A frame spring 9 which is fixedly secured to the support frame 8 by a screw 28 is exerting an urging force on the reflecting mirror 7. The axis of the dowel 29a is eccentric with respect to that of a fitting engagement part 29b of the first eccentric pin 29. When the first eccentric pin 29 is rotated, the reflecting mirror 7 abutting on the dowel 29a is caused to move in a direction perpendicular to a reflecting surface of the reflecting mirror 7. Since the lower part of the reflecting mirror 7 is abutting on the support part 8b of the support frame 8, the rotation of the first eccentric pin 29 changes the angle of inclination of the reflecting mirror 7 on a horizontal axis as viewed in FIG. 3.

The support frame 8 is supported by a part of the body (not shown) of the film scanner in such a way as to be rotatable on an axis 8c thereof. A driving lever 10 is arranged to be rotatable also on the axis 8c of the support frame 8. A tension spring 11 is hung between an arm part 10b of the driving lever 10 and the support frame 8 to urge the driving lever 10 to rotate clockwise relative to the support frame 8. However, a claw part 10a of the driving lever 10 abuts on the support frame 8 to prevent the clockwise rotation of the driving lever 10. The driving lever 10 is provided with a roller 12 which is arranged to be rotatable around a dowel 27. The roller 12 is located within a moving area of a cam face 15a of a cam 15.

The cam 15 is rotatably supported by a part of the body (not shown) of the film scanner and is driven to be rotated by a motor 16. A spring 13 is hung on the driving lever 10 to urge the driving lever 10 to rotate clockwise. Since the claw 10a of the driving lever 10 is abutting on the support frame 8, the support frame 8 is also urged clockwise by the spring 13. However, the support frame 8 stays in its position (shown in FIG. 1) as an abutting part 8d of the support frame 8 abuts on a second eccentric pin 14 which is rotatably attached to the body (not shown) of the film scanner.

As shown in FIG. 3, the second eccentric pin 14 has a dowel 14a which is rotatably fitted in the body (not shown)

of the film scanner. The second eccentric pin 14 also has a stopper part 14b on which the support frame 8 is to abut. The axis of the stopper part 14b is eccentric with respect to the axis of the dowel 14a. Therefore, when the second eccentric pin 14 is caused to rotate, the position where the abutting part 8d of the support frame 8 abuts on the second eccentric pin 14 varies to cause the support frame 8 to rotate on the axis 8c. As a result, the inclination of the reflecting mirror 7 on its vertical axis, as viewed in FIG. 3, comes to vary accordingly.

In FIGS. 1 and 2, reference numeral 17 denotes a developed film (cartridge film) which is stowed in a cartridge 18 in such a way as to be inserted and pulled out as desired. The cartridge film 17 can be pulled out from the cartridge 18 while being wound on a spool 19. The spool 19 is arranged to be driven by a motor 20. An illuminating light source 21 is arranged to illuminate an image recorded on the cartridge film 17. Reference numeral 22 denotes a film strip. The film strip 22 is arranged to be moved to the right or left, as viewed in FIGS. 1 and 2, in a state of being sandwiched in between driving rollers 23 and driving rollers 24. The driving rollers 23 are arranged to be driven by a motor 25. An illuminating light source 26 is arranged to illuminate an image recorded on the film strip 22.

An operation of performing a changeover between a state of picking up an image from the cartridge film 17 and a state of picking up an image from the film strip 22 is next described. FIG. 1 shows the state of picking up an image from the cartridge film 17. Image light from the cartridge film 17 which is being illuminated by the illuminating light source 21 is reflected by the reflecting mirror 7 and is made to enter the image pickup lens 5. The image light which has exited from the image pickup lens 5 is made incident on the image sensor 1 to form an image, thereby obtaining an image signal. In this instance, focus of the image pickup lens 5 is adjusted by moving the lens frame 4 with the motor 6 in the direction of the optical axis. In the meantime, when a current is applied to the motor 16 in this state, the cam 15 rotates clockwise, so that the cam face 15a of the cam 15 then pushes the roller 12 which is disposed at the driving lever 10 to cause the driving lever 10 to rotate counterclockwise against the urging force of the spring 13. Then, since the driving lever 10 and the support frame 8 are under a unifying force exerted by the tension spring 11 and the claw part 10a, the support frame 8 is caused to rotate also in the counterclockwise direction to be retracted from the front surface of the image pickup lens 5. After being thus retracted, the support frame 8 comes to abut on a stopper 30 which is provided on a part of the body (not shown) of the film scanner. Then, the roller 12 of the driving lever 10 is moved further by the cam face 15a of the cam 15 after the support frame 8 abuts on the stopper 30. Accordingly, the driving lever 10 is further rotated counterclockwise against the force of the tension spring 11. After the roller 12 reaches the outside face 15b of the cam 15, a current applied to the motor 16 is cut off, so that the cam 15 comes to a stop in the state shown in FIG. 2. In this state, image light from the film strip 22 obtained with the film strip 22 illuminated by the illuminating light source 26 is made to enter the image pickup lens 5. Then, the image light which has exited from the image pickup lens 5 is made incident on the image sensor 1 to form an image, thereby obtaining an image signal. Focus adjustment to be made in that instance is also accomplished by moving the lens frame 4 with the motor 6 like in the case of the cartridge film 17.

Next, a method of adjusting the image pickup position of the image sensor 1 relative to each of the image surface of the cartridge film 17 and that of the film strip 22 is described.

In the state of having the reflecting mirror 7 retracted from the front surface of the image pickup lens 5 as shown in FIG. 2, the position of the base plate 2 is adjusted in such a way as to have the image sensor 1 in a predetermined position and at a predetermined angle of inclination relative to the image surface of the film strip 22. The base plate 2 is then fixed in the adjusted position by applying the adhesive 3 to the lens frame 4 as shown in FIG. 2. After that, the reflecting mirror 7 is rotated to a position in front of the image pickup lens 5 as shown in FIG. 1. Then, the first eccentric pin 29 and/or the second eccentric pin 14 is rotated such that the image surface of the cartridge film 17 is in a predetermined position and at a predetermined angle of inclination relative to the image sensor 1. Then, the first eccentric pin 29 and the second eccentric pin 14 are fixed by means of an adhesive or the like in positions thus adjusted. Incidentally, the position adjustment, for focusing, in the direction of the optical axis between the image surface of the film strip 22 and the image sensor 1 and between the image surface of the cartridge film 17 and the image sensor 1 can be carried out by means of the motor 6 every time an image is picked up, so that no adjustment work for focusing is required there.

As described in the foregoing, according to the embodiment described above, both an image recorded on the film strip and an image recorded on the cartridge film can be read, and the adjustment on the image pickup positions for these films of different forms can be performed independently of each other and without difficulty.

While the embodiment described above is arranged to read images recorded on the film strip and the cartridge film, the invention is not limited to reading images recorded on the films of the forms mentioned in the foregoing. The invention is applicable also to reading images from films of other forms, such as a slide form, a disk form, a cartridge form, a sheet form and a spool winding form.

While the embodiment described above is arranged to use one movable total reflection mirror, the invention is not limited to that arrangement. The invention may be carried out by using either a plurality of reflecting mirrors or a fixed half (semi-transparent) mirror. In a case where the half mirror is used, the image reading condition is arranged to be switched from one condition over to the other by putting out an illuminating light source disposed on the side not to be read.

While the embodiment described above is arranged to fix the adjusting part in position by means of an adhesive, the invention is not limited to that arrangement. The adjusting part may be arranged to be in a half-fixed structure and to be readjusted after completion of the manufacture of the image reading apparatus.

Further, while the embodiment described above is arranged to read an image from a film original, the invention is not limited to such an arrangement. The invention is applicable also to a case where an image is to be read from a reflection-type original.

As described in the foregoing, in accordance with the invention, an image reading apparatus can be arranged to be capable of reading originals of different forms and to permit easy adjustment.

What is claimed is:

1. An image reading apparatus comprising:

(A) an image sensor which picks up an image recorded on one of the first original in a first position and the second original in a second position different from the first position;

(B) an image forming lens which images on said image sensor the image recorded on one of the first original and the second original;

(C) a reflection member which changes over an optical path so as to cause the image recorded on one of the first original and the second original to be selectively imaged on said image sensor by said image forming lens;

(D) a movable member which moves said reflection member in a first direction; and (E) an adjusting member which adjusts said reflection member in an inclination to a second direction different from said first direction.

2. An image reading apparatus according to claim 1, further comprising a fixing member which keeps a distance between said image sensor and said image forming lens constant.

3. An image reading apparatus according to claim 2, further comprising a focus adjusting member which adjusts focus by moving said fixing means in a direction of an optical axis of said image forming lens.

4. An image reading apparatus according to claim 1, further comprising first original moving means for moving the first original and second original moving means for moving the second original.

5. An image reading apparatus according to claim 1, wherein each of the first original and the second original is a light-transmissible original.

6. An image reading apparatus according to claim 5, wherein the first original is a film strip, and the second original is a film movable out of and into a cartridge.

7. An image reading apparatus according to claim 1, wherein said reflection member does not lie in a light path from said first original to said image sensor when picking up said first original, and said reflection member lies in the light path from said second original to said image sensor when picking up said second original.

8. An image reading apparatus according to claim 7, wherein said adjusting member adjusts an inclination of said reflection member picking up said second original.

9. An image reading apparatus according to claim 1, further comprising a first original holding member which holds the first original in a first reading position and a second original holding member which holds the second original in a second reading position different from the first reading position.

* * * * *